(12) United States Patent
Kim et al.

(10) Patent No.: US 12,428,546 B2
(45) Date of Patent: Sep. 30, 2025

(54) ELASTOMER COMPOUNDS FOR USE WITHIN A BOREHOLE

(71) Applicant: Halliburton Energy Services, Inc., Houston, TX (US)

(72) Inventors: Byong Jun Kim, Cypress, TX (US); James H. Ryan, Denton, TX (US); Charles Timothy Smith, Edgewood, TX (US); Shashishekara Talya, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 570 days.

(21) Appl. No.: 17/005,625

(22) Filed: Aug. 28, 2020

(65) Prior Publication Data

US 2021/0102049 A1 Apr. 8, 2021

Related U.S. Application Data

(60) Provisional application No. 62/909,894, filed on Oct. 3, 2019.

(51) Int. Cl.
*E21B 4/02* (2006.01)
*C08K 3/04* (2006.01)
*C08K 3/22* (2006.01)
*C08L 15/00* (2006.01)

(52) U.S. Cl.
CPC .............. *C08L 15/005* (2013.01); *C08K 3/04* (2013.01); *C08K 3/22* (2013.01); *E21B 4/02* (2013.01); *C08K 2003/2296* (2013.01); *C08L 2205/025* (2013.01); *C08L 2205/03* (2013.01); *C08L 2207/04* (2013.01)

(58) Field of Classification Search
CPC .................................. E21B 43/12; E21B 4/02
See application file for complete search history.

(56) References Cited

U.S. PATENT DOCUMENTS

| 4,702,860 | A | * | 10/1987 | Kinderov | H01B 1/24 |
| | | | | | 252/502 |
| 4,851,068 | A | * | 7/1989 | Uyehara | B29D 99/0053 |
| | | | | | 156/306.9 |
| 6,406,030 | B1 | * | 6/2002 | Fang | F16J 15/32 |
| | | | | | 277/944 |
| 6,905,319 | B2 | | 6/2005 | Guo | |
| 8,197,241 | B2 | | 6/2012 | Robisson | |
| 8,734,141 | B2 | | 5/2014 | Slay | |
| 8,800,688 | B2 | | 8/2014 | John | |

(Continued)

FOREIGN PATENT DOCUMENTS

| CN | 103396591 B1 | 4/2016 |
| CN | 106543503 A1 | 3/2017 |
| WO | 2018057685 A1 | 3/2018 |

OTHER PUBLICATIONS

International Search Report and Written Opinion dated Nov. 11, 2020 for PCT/PCT/US2020/048755 filed Aug. 31, 2020 (11 pgs.).

*Primary Examiner* — Giovanna Wright
(74) *Attorney, Agent, or Firm* — K&L Gates LLP

(57) ABSTRACT

A downhole tool including a downhole motor. The downhole motor may include a housing, a stator positioned within the housing, and a rotor positioned within the stator. The stator may include an elastomer compound that may include at least one of NBR or HNBR, process aids, and at least one of zinc oxide or graphite.

9 Claims, 3 Drawing Sheets

(56) References Cited

U.S. PATENT DOCUMENTS

| | | |
|---|---|---|
| 8,944,789 B2 | 2/2015 | Butuc |
| 9,988,513 B2 | 6/2018 | Kyker |
| 10,012,230 B2 | 7/2018 | Sicilian |
| 10,215,176 B2 | 2/2019 | Cariveau |
| 2009/0038858 A1 | 2/2009 | Griffo |
| 2009/0152009 A1 | 6/2009 | Slay |
| 2012/0312560 A1 | 12/2012 | Bahr |
| 2015/0022051 A1 | 1/2015 | Meng |
| 2015/0176363 A1* | 6/2015 | Mazyar ............ E21B 23/06 264/41 |
| 2015/0233373 A1* | 8/2015 | Sicilian ............ C08K 9/04 29/888.023 |
| 2016/0036284 A1* | 2/2016 | Meng ............ E21B 4/02 524/404 |
| 2016/0362543 A1* | 12/2016 | Kyker ............ F01C 21/08 |
| 2017/0101990 A1* | 4/2017 | Cariveau ............ F04C 2/1075 |
| 2017/0204665 A1 | 7/2017 | Meng |
| 2018/0328359 A1 | 11/2018 | Jones |

* cited by examiner

ELASTOMER COMPOUNDS FOR USE WITHIN A BOREHOLE

BACKGROUND

This section is intended to provide relevant background information to facilitate a better understanding of the various aspects of the described embodiments. Accordingly, these statements are to be read in this light and not as admissions of prior art.

Progressing cavity motors, also known as Moineau-type motors having a rotor that rotates within a stator using pressurized drilling fluid have been used in borehole drilling applications for many years. Some Moineau-type pumps and motors used in borehole drilling include stators having an elastomer compound bonded to a steel structure. Pressurized drilling fluid (e.g., drilling mud) is typically driven into the motor and into a cavity between the rotor and the stator, which generates rotation of the rotor and a resulting torque can be produced. The resulting torque is typically used to drive a working tool, such as a drill bit, to cut material.

However, over time the repeated flexing of the elastomer compound, the presence of abrasive particles in the fluid being pumped or driving the motor, chemical breakdown, high temperatures, and other factors can lead to failure of the elastomer compound. Failure of the elastomer compound can, in turn, lead to loss of sealing between the rotor and stator and cause the motor to stall.

Elastomer compounds are also used within a borehole to create dynamic seals between moving parts. However, similar to the elastomer compounds used for stators, the repeated flexing of the elastomer compound, the presence of abrasive particles in the fluid being pumped or driving the motor, chemical breakdown, high temperatures, and other factors can lead to failure of the elastomer compound. Failure of the elastomer compound can, in turn, cause fluid to pass through the dynamic seal.

BRIEF DESCRIPTION OF THE DRAWINGS

Embodiments of the elastomer compounds are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes elastomer compounds for use within a borehole. The elastomer compounds provide an increased elongation compared to traditional elastomer compounds that utilize only carbon black and process aids and, therefore, extend the usable life of the elastomer compounds in downhole applications. Further, the elastomer compounds provide similar (i.e., within 20%) or improved stiffness at low elongations when compared to traditional elastomer compounds.

A main borehole may in some instances be formed in a substantially vertical orientation relative to a surface of the well, and a lateral borehole may in some instances be formed in a substantially horizontal orientation relative to the surface of the well. However, reference herein to either the main borehole or the lateral borehole is not meant to imply any particular orientation, and the orientation of each of these boreholes may include portions that are vertical, non-vertical, horizontal or non-horizontal. Further, the term "uphole" refers a direction that is towards the surface of the well, while the term "downhole" refers a direction that is away from the surface of the well.

Figure 1:
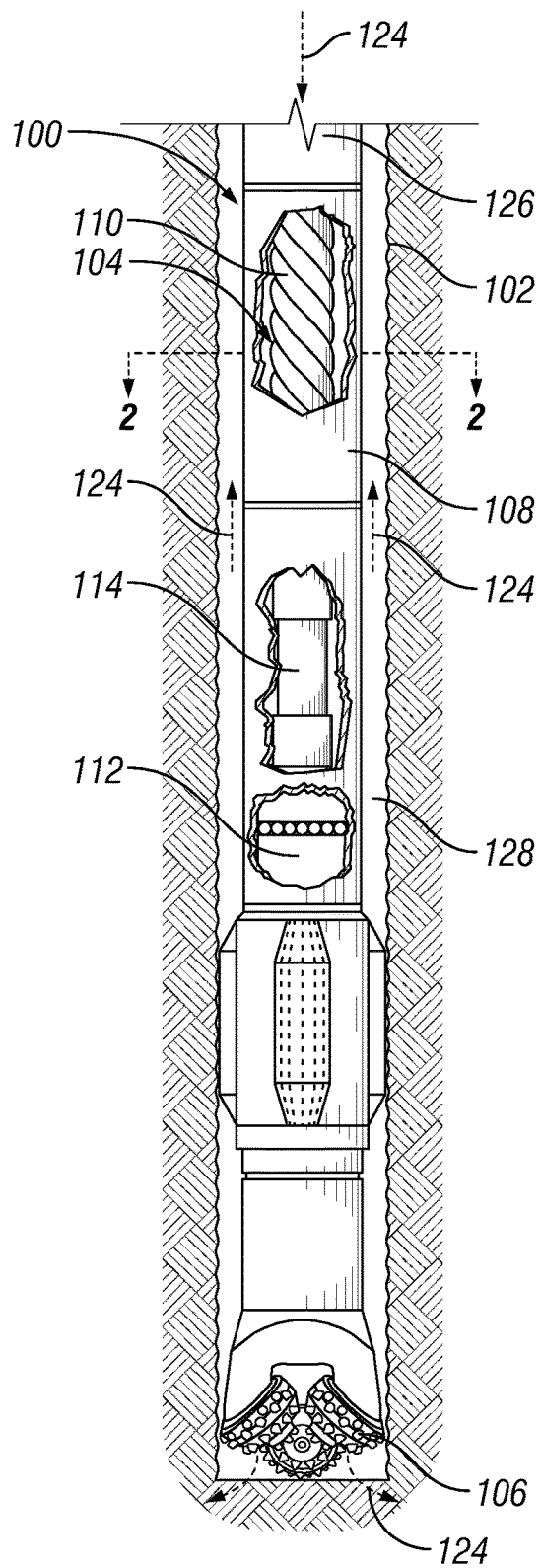
FIG. 1 is a drilling system disposed in a borehole, according to one or more embodiments.
Figure 2:
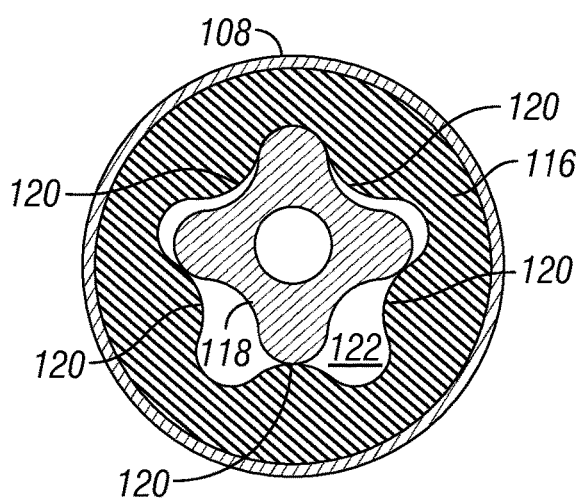
FIG. 2 is a cross-sectional view of the stator and rotor of FIG. 1.

FIGS. 1 and 2 are a broken side view and a cross section view of a drilling system 100 disposed in a borehole 102 and that includes a downhole motor 104 connected to a drill bit 106. The downhole motor 104 includes a tubular housing 108 that encloses a power unit 110. The power unit 110 is connected to a bearing section assembly 112 via a transmission unit 114. Referring to FIG. 2, the power unit 110 includes a stator 116 and a rotor 118. The stator 116 includes multiple (e.g., five) lobes 120 extending along the stator 116 in a helical configuration and defining a cavity 122. The rotor 118 also includes lobes extending along the rotor 118 in a helical configuration. The stator 116 and rotor 118 can also have more or fewer lobes where the difference between the rotor and stator lobes is one extra stator lobe for the number of rotor lobes.

The rotor 118 is operatively positioned in the cavity 122 such that the rotor lobes cooperate with the stator lobes 120 in that applying fluid pressure to the cavity 122 by flowing fluid within the cavity 122 causes the rotor 118 to rotate within the stator 116. For example, referring to FIGS. 1 and 2, pressurized drilling fluid (e.g., drilling mud) 124 can be introduced at an upper end of the power unit 110 and forced down through the cavity 122. As a result of the pressurized drilling fluid 124 flowing through the cavity 122, the rotor 118 rotates, which causes the drill bit 106 to rotate and cut away material from the formation. From the cavity 122, the drilling fluid 124 is expelled at the lower end and then subsequently exhausted from the drill bit 106.

During a drilling operation, the drilling fluid 124 is pumped down the interior of a drill string 126 (shown broken away) attached to downhole motor 104. The drilling fluid 124 enters cavity 122 having a pressure that is a combination of pressure imposed on the drilling fluid by pumps (e.g., pumps at the surface) and the hydrostatic pressure of the above column of drilling fluid 124. The pressurized drilling fluid entering cavity 122, in cooperation with the lobes 120 of the stator 116 and the geometry of the stator 116 and the rotor 118 causes the rotor 118 to turn to allow the drilling fluid 124 to pass through the motor 104, thus rotating the rotor 118 relative to the stator 116. The drilling fluid 124 subsequently exits through ports (e.g., jets) in the drill bit 106 and travels upward through an annulus 128 between the drill string 126 and the borehole 102 and is received at the surface where it is captured and pumped down the drill string 126 again.

The downhole motor 104 falls into a general category referred to as Moineau-type motors. The downhole motor 104 is, however, generally subjected to greater torqueing loads than worm pumps that also fall into the general category of Moineau-type motors. This is particularly true with high power density (HPD) downhole motors 104 used in oil and gas well drilling.

The dynamic loading conditions typically involved in downhole drilling applications, can generate substantial heat in the stator 116 and the rotor 118, which can lead to thermal degradation and/or expansion (i.e., swelling) of the stator elastomer and, therefore, can lead to damage of the stator elastomer and to separation of the stator elastomer components from the housing. Further, the stator elastomer is susceptible to wear because of reduced clearance between the rotor 118 and the stator 116. The reduced clearance typically induces higher loads on the stator elastomer. This wear is generally known as chunking. In some cases, the chunking of the stator can result in significant pressure loss so that the power unit is no longer able to produce suitable power levels to continue the drilling operation. Additionally, contact between the stator 116 and the rotor 118 during use can cause these components to wear or deform (i.e., the elastomer portion of the stator 116), which results in the spacing between the stator 116 and the rotor 118 to increase, reducing the power produced by the motor.

To address these issues, the stator 116 is made of an elastomer compound that includes components such as, but not limited to, carbon black, nitrile butadiene rubber ("NBR"), hydrogenated nitrile butadiene rubber ("HNBR"), and various process aids, such as, but not limited to, cure accelerators and cure retarders, known to those skilled in the art. Carbon black is typically added in amounts of approximately between 0 and 100 parts per hundred rubber ("PHR"), depending on the series of carbon black and the amount of dry lubricants that are added to the elastomer compound, as discussed in more detail below. However, some elastomer compounds may use a larger amount of carbon black than 100 PHR. Further, some embodiments may omit carbon black. Process aids are typically added in amounts of approximately between 0 and 20 PHR. However, some embodiments may use a larger amount of process aids than 20 PHR. The total amount of carbon black, process aids, and/or dry lubricant used in the elastomer compound is typically approximately between 50 and 150 PHR. However, some elastomer compounds may include less 50 PHR or more than 150 PHR of carbon black, process aids, and dry lubricant.

The stator 116 elastomer further includes a dry lubricant. Using various organic or inorganic dry lubricating particles (micron, sub-micron, or nano-size) in stator elastomer formulation improves lubrication, thus reducing interfacial stress and heat build-up. In at least one embodiment, the dry lubricant is used in place of at least a portion of the carbon black used to formulate the stator elastomer compound. In other embodiments, the dry lubricant is used in addition to the carbon black when formulating the elastomer.

In one or more embodiments, graphite is added to the stator elastomer in place of at least a portion of the carbon black. The amount of graphite added to the stator elastomer is typically approximately between 0 and 100 PHR. However, some embodiments may use up to approximately 150 PHR of graphite. Further, the graphite may be added in addition to the carbon black or replace the carbon black.

In one or more embodiments, zinc oxide is added to the stator elastomer in place of at least a portion of the carbon black. The amount of zinc oxide added to the stator elastomer is typically approximately between 0 and 100 PHR. However, some embodiments may use up to approximately 150 PHR of zinc oxide. Further, the zinc oxide may be added in addition to the carbon black.

In one or more embodiments, both graphite and zinc oxide may be added to the stator elastomer in in place of at least a portion of the carbon black. The combined amount of graphite and zinc oxide added to the stator elastomer is typically approximately between 0 and 100 PHR. However, some embodiments may use a larger amount of graphite and zinc oxide than 100 PHR. Further, the graphite and zinc oxide may be added in addition to the carbon black.

Additionally, molybdenum disulfide, polytetrafluoroethylene ("PTFE"), tungsten disulfide, aluminum oxide, aluminum nitride, calcium fluoride, cerium fluoride, talc, boron nitride, and silicone carbide may be used in place of or in addition to carbon black, graphite, and/or zinc oxide in one or more embodiments.

Figure 3:
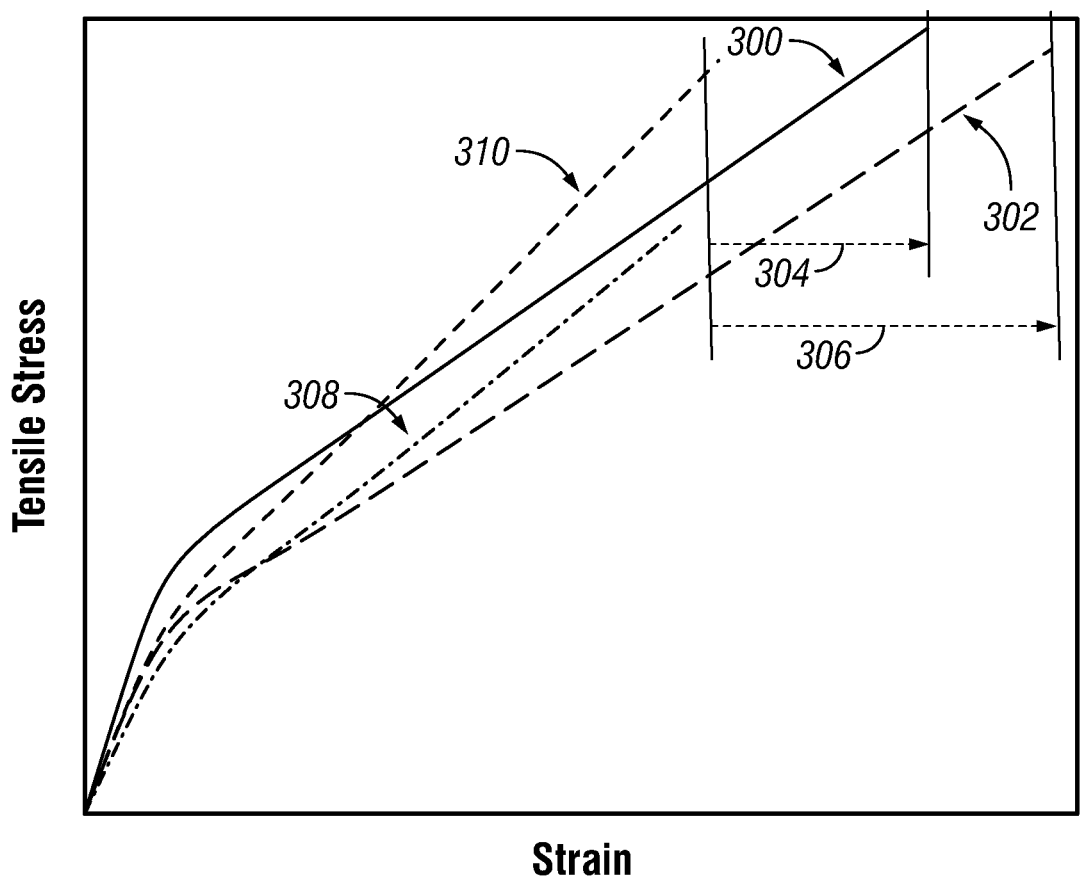
FIG. 3 is a tensile stress-strain curve of stator elastomers, according to one or more embodiments.

In addition to improving the lubricity and the thermal conductivity of the elastomer compound, the addition of the dry lubricants detailed above also improves the mechanical properties of the elastomer compound. As shown in FIG. 3, the elastomer compounds 300, 302 that include both graphite and zinc oxide can be subjected to larger amounts of elongation 304, 306 before failure when compared to traditional elastomer compounds 308, 310 without these additives. Further, the elastomer compounds 300, 302 that include graphite and zinc oxide retain similar stiffness as traditional elastomer compounds 308, 310 when subjected to low elongation up to approximately 50% elongation. High temperatures, such as temperatures within a borehole and hysteresis of elastomers, reduce the elongation an elastomer compound can tolerate before failure. Therefore, elastomer compounds that include the dry lubricants detailed above offer increased flex-fatigue life in mud chemicals and wear resistance when used borehole applications when compared to traditional elastomer compounds while providing similar stiffness at low strain to traditional elastomer compounds.

Figure 4:
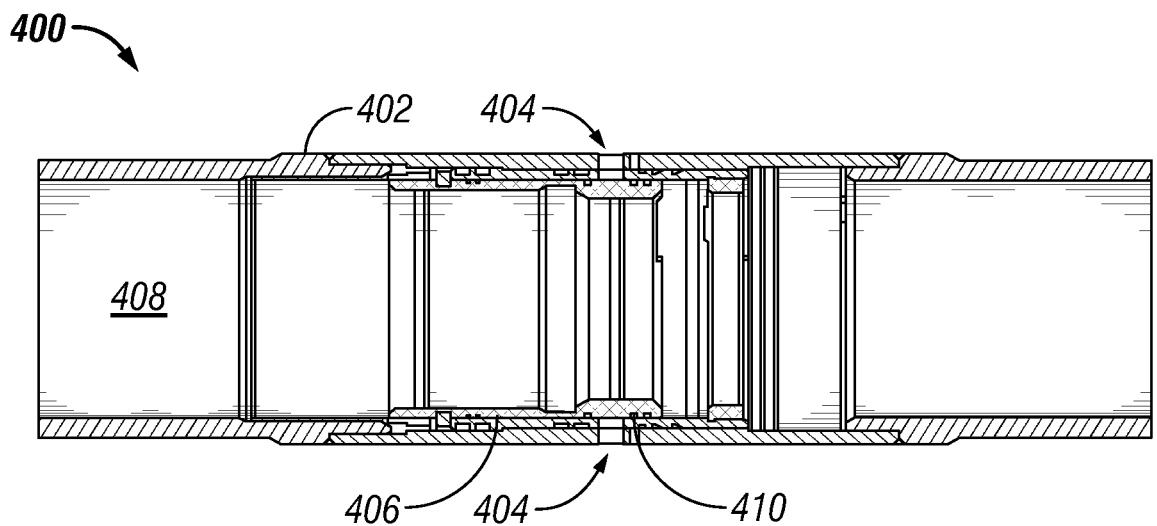
FIG. 4 is a cross-sectional diagram of a downhole tool in a run-in position, according to one or more embodiments.
Figure 5:
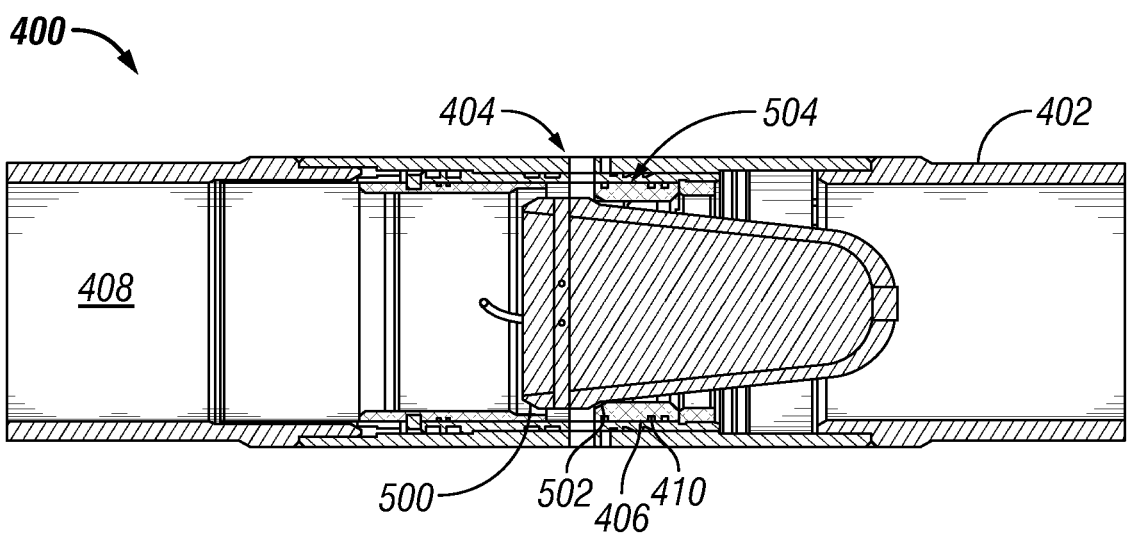
FIG. 5 is a cross-sectional diagram of the downhole tool of FIG. 4 in an actuated position.

Turning now to FIGS. 4 and 5, FIGS. 4 and 5 are a cross-sectional diagrams of a downhole tool 400 that uses the elastomer compound described above, according to one or more embodiments. The downhole tool 400 is positionable between a run-in position in which the valve is closed and an open position, as described in more detail below. The downhole tool 400 includes a tubular body 402 that includes one or more ports 404 and an inner sleeve 406 slidable within the tubular body 402. The inner sleeve 406 is initially held in the run-in position via a shear pin or similar means known to those skilled in the art to block the ports 404 and prevent fluid from passing from the bore 408 of the downhole tool, through the ports 404, and into an annulus surrounding the downhole tool 400. A dynamic seal 410 made of the elastomer compound described above is positioned between the inner sleeve 406 and the tubular body 402 to create a seal between the inner sleeve 406 and the tubular body 402.

When the downhole tool 400 is to be opened, a plug 500 is pumped downhole and impacts a seat 502 coupled to or formed in an uphole portion 504 of the inner sleeve 406. The pressure applied to the plug 500 is great enough that the locking mechanism holding the inner sleeve 406 in the run-in position is overcome and the inner sleeve 406 slides into an open position, as shown in FIG. 4. The movement to the open position opens the ports 404 in the tubular body 402 and allows fluid to flow out from the bore 408 of the downhole tool 400. As the inner sleeve 406 moves relative to the tubular body, the dynamic seal 410 maintains a seal between the inner sleeve and the tubular body. Due to the elastomer compound discussed above, the dynamic seal 410 offers increased longevity and heat resistance when compared to NBR or HNBR dynamic seals.

Although the dynamic seal 410 is discussed with reference to an inner sleeve 406 within a tubular body 402, the dynamic seal 410 is not thereby limited. The dynamic seal may also be used in pistons, valves, dynamically strained and/or stressed pads, and other applications within downhole tools that require a dynamic seal between two components.

Further examples include:

Example 1 is a downhole tool including a downhole motor. The downhole motor includes a housing, a stator positioned within the housing, and a rotor positioned within the stator. The stator includes an elastomer compound including at least one of NBR or HNBR, process aids, and at least one of zinc oxide or graphite.

In Example 2, the embodiments of any preceding paragraph or combination thereof further include wherein a total amount of the process aids and the at least one of zinc oxide or graphite is between 50 and 150 PHR.

In Example 3, the embodiments of any preceding paragraph or combination thereof further include wherein the elastomer compound further includes carbon black.

In Example 4, the embodiments of any preceding paragraph or combination thereof further include wherein a total amount of the process aids, the at least one of zinc oxide or graphite, and the carbon black is between 50 and 150 PHR.

In Example 5, the embodiments of any preceding paragraph or combination thereof further include wherein a total amount of the carbon black and the at least one of zinc oxide or graphite is 100 PHR or less.

In Example 6, the embodiments of any preceding paragraph or combination thereof further include wherein the elastomer compound further includes at least one of molybdenum disulfide, PTFE, tungsten disulfide, calcium fluoride, cerium fluoride, talc, boron nitride, aluminum oxide, aluminum nitride, or silicone carbide.

Example 7 is a downhole tool that includes a first component, a second component that is movable relative to the first component, and a dynamic seal positioned to create a seal between a portion of the first component and a portion of the second component. The downhole seal includes an elastomer compound that includes at least one of NBR or HNBR, process aids, and at least one of zinc oxide or graphite.

In Example 8, the embodiments of any preceding paragraph or combination thereof further include wherein a total amount of the process aids and the at least one of zinc oxide or graphite is between 50 and 150 PHR.

In Example 9, the embodiments of any preceding paragraph or combination thereof further include wherein the elastomer compound further includes carbon black.

In Example 10, the embodiments of any preceding paragraph or combination thereof further include wherein a total amount of the process aids, the at least one of zinc oxide or graphite, and the carbon black is between 50 and 150 PHR.

In Example 11, the embodiments of any preceding paragraph or combination thereof further include wherein a total amount of the carbon black and the at least one of zinc oxide or graphite is 100 PHR or less.

In Example 12, the embodiments of any preceding paragraph or combination thereof further include wherein the elastomer compound further includes at least one of molybdenum disulfide, PTFE, tungsten disulfide, calcium fluoride, cerium fluoride, talc, boron nitride, aluminum oxide, aluminum nitride, or silicone carbide.

Example 13 is an elastomer compound for use within a borehole. The elastomer compound includes at least one of NBR or HNBR, process aids, and at least one of zinc oxide or graphite.

In Example 14, the embodiments of any preceding paragraph or combination thereof further include wherein a total amount of the process aids and the at least one of zinc oxide or graphite is between 50 and 150 PHR.

In Example 15, the embodiments of any preceding paragraph or combination thereof further include carbon black.

In Example 16, the embodiments of any preceding paragraph or combination thereof further include wherein a total amount of the process aids, the at least one of zinc oxide or graphite, and the carbon black is between 50 and 150 PHR.

In Example 17, the embodiments of any preceding paragraph or combination thereof further include wherein a total amount of the carbon black and the at least one of zinc oxide or graphite is 100 PHR or less.

In Example 18, the embodiments of any preceding paragraph or combination thereof further include at least one of molybdenum disulfide, PTFE, tungsten disulfide, calcium fluoride, cerium fluoride, talc, boron nitride, aluminum oxide, aluminum nitride, or silicone carbide.

Example 19 is a method of drilling a borehole using a motor. The method includes operating the motor by pumping pressurized fluid through the motor. The motor includes an elastomer compound that includes at least one of NBR or HNBR, process aids, and at least one of zinc oxide or graphite. The method also includes rotating a drill bit via the motor.

In Example 20, the embodiments of any preceding paragraph or combination thereof further include wherein the elastomer compound further includes carbon black and a total amount of the process aids, the at least one of zinc oxide or graphite, and the carbon black is between 50 and 150 PHR.

As used herein, a range that includes the term between is intended to include the upper and lower limits of the range; e.g., between 50 and 150 includes both 50 and 150. Additionally, the term "approximately" includes all values within 5% of the target value; e.g., approximately 100 includes all values from 95 to 105, including 95 and 105. Further, approximately between includes all values within 5% of the target value for both the upper and lower limits; e.g., approximately between 50 and 150 includes all values from 47.5 to 157.5, including 47.5 and 157.5.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A downhole tool comprising a downhole motor, the downhole motor comprising:
   a housing;
   a stator positioned within the housing and comprising an elastomer compound comprising:
      at least one of nitrile butadiene rubber ("NBR") or hydrogenated nitrile butadiene rubber ("HNBR");
      carbon black;
      process aids; and
      graphite,
      wherein a total amount of the carbon black is less than 100 parts per hundred rubber ("PHR"), a total amount of the process aids is less than 20 PHR, and a total amount of the graphite is less than 100 PHR; and
   a rotor positioned within the stator.

2. The downhole tool of claim 1, wherein a total amount of the process aids and the graphite is between 50 and 120 parts per hundred rubber ("PHR").

3. The downhole tool of claim 1, wherein a total amount of the process aids, the graphite, and the carbon black is between 50 and 150 PHR.

4. The downhole tool of claim 1, wherein a total amount of the carbon black and the graphite is 100 PHR or less.

5. The downhole tool of claim 1, wherein the elastomer compound further comprises at least one of molybdenum disulfide, polytetrafluoroethylene ("PTFE"), tungsten disulfide, calcium fluoride, cerium fluoride, talc, boron nitride, or silicone carbide.

6. An elastomer compound for use within a borehole, the elastomer compound comprising:
   at least one of nitrile butadiene rubber ("NBR") or hydrogenated nitrile butadiene rubber ("HNBR");
   carbon black;
   process aids;
   graphite; and
   zinc oxide,
   wherein a total amount of the carbon black is less than 100 parts per hundred rubber ("PHR"), a total amount of the process aids is less than 20 PHR, a total amount of the graphite is less than 100 PHR, and a total amount of zinc oxide is less than 100 PHR;
   wherein the amount of carbon black is less due to inclusion of the graphite while at least one of lubricity or thermal conductivity of the elastomer compound is maintained or improved as compared to an elastomer compound without graphite,
   wherein inclusion of graphite and zinc oxide improves elongation of the elastomer compound as compared to an elastomer compound without graphite and zinc oxide, and
   wherein a total amount of the process aids and the graphite is between 50 and 120 parts per hundred rubber ("PHR").

7. The elastomer compound of claim 6, wherein a total amount of the process aids, the graphite, and the carbon black is between 50 and 150 PHR.

8. The elastomer compound of claim 6, wherein a total amount of the carbon black and the graphite is 100 PHR or less.

9. The elastomer compound of claim 6, further comprising at least one of molybdenum disulfide, polytetrafluoroethylene ("PTFE"), tungsten disulfide, calcium fluoride, cerium fluoride, talc, boron nitride, or silicone carbide.

* * * * *